(12) United States Patent
Freund et al.

(10) Patent No.: US 6,950,565 B2
(45) Date of Patent: Sep. 27, 2005

(54) SUBMOUNT FOR HIGH SPEED ELECTRONIC DEVICES

(75) Inventors: Joseph Michael Freund, Fogelsville, PA (US); John Michael Geary, Longswamp Township, PA (US)

(73) Assignee: Agere Systems Inc, Allentown, PA (US)

( * ) Notice: Subject to any disclaimer, the term of this patent is extended or adjusted under 35 U.S.C. 154(b) by 276 days.

(21) Appl. No.: 10/265,834

(22) Filed: Oct. 7, 2002

(65) Prior Publication Data

US 2004/0066998 A1 Apr. 8, 2004

(51) Int. Cl.[7] .............................................. G02F 1/035
(52) U.S. Cl. ........................................... 385/2; 385/92
(58) Field of Search ................................ 385/2, 88, 92, 385/100, 101

(56) References Cited

U.S. PATENT DOCUMENTS

| | | | | |
|---|---|---|---|---|
| 3,735,289 A | * | 5/1973 | Bruene | 333/5 |
| 4,770,483 A | * | 9/1988 | Ridgway | 385/24 |
| 5,848,084 A | * | 12/1998 | Rokugawa | 372/38.04 |
| 5,926,308 A | * | 7/1999 | Lee et al. | 359/237 |
| 6,164,837 A | * | 12/2000 | Haake et al. | 385/90 |
| 6,603,782 B2 | * | 8/2003 | Nakanishi et al. | 372/36 |
| 6,734,755 B2 | * | 5/2004 | Cites et al. | 333/33 |

* cited by examiner

Primary Examiner—Daniel Stcyr

(57) ABSTRACT

The present invention is an electronic device including a submount for mounting a component thereon. The submount includes a first high speed transmission line electrically coupled to a contact for providing electrical contact to the component. At least two load resistors are also formed on the submount and electrically coupled to the contact. A second high speed transmission line is coupled between the two resistors to a ground electrode. The impedance and inductance of the second transmission line is desirably such as to provide a loss v. frequency characteristic that is essentially opposite to that of the first transmission line so as to produce a combined characteristic which is essentially flat.

9 Claims, 6 Drawing Sheets

SUBMOUNT FOR HIGH SPEED ELECTRONIC DEVICES

FIELD OF THE INVENTION

The present invention relates generally to high speed electronic devices and, more particularly, to a submount for high speed optoelectronic devices such as lasers, modulators, and photodetectors.

BACKGROUND OF THE INVENTION

Optical systems have become increasingly important in modern telecommunications primarily due to their huge information handling capacity. Systems usually include lasers, photodetectors, and modulators, as well as other elements. The speed of such devices has increased to a point where 40 GHz operation will be a standard for the next generation of systems.

One of the problems associated with such high speeds is that transmission line loss increases with frequency. For example, a loss of 1 dB is typical for a 40 GHz modulator with a co-planar waveguide transmission line used for biasing the modulator. It is undesirable to have a loss characteristic which varies with frequency, since such a characteristic tends to distort the optical intensity waveform resulting in possible loss of data. It is desirable, therefore to produce devices with a low and essentially constant loss characteristic as a function of frequency.

SUMMARY OF THE INVENTION

The present invention is an electronic device including a submount for mounting a component thereon. The submount includes a first high speed transmission line electrically coupled to a contact for providing electrical contact to the component. At least two load resistors are also formed on the surmount and electrically coupled to the contact. A second high speed transmission line is formed comprising a conductor coupled between the resistors and a ground electrode. It is desirable to have the impedance and inductance of the second transmission line provide a loss v. frequency characteristic that is essentially opposite to that of the first transmission line so as to produce a combined characteristic which is essentially flat.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice in the semiconductor industry, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
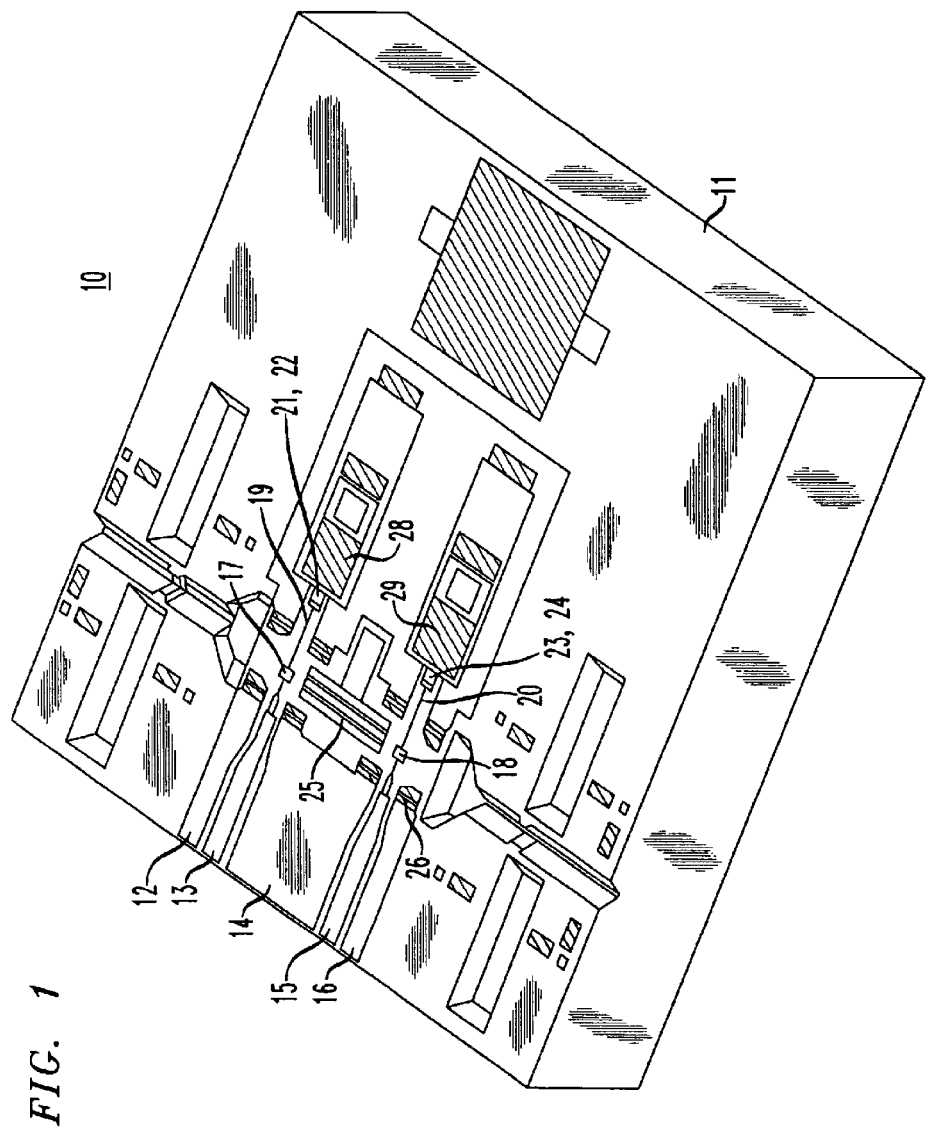
FIG. 1 is a perspective view of a submount which can be utilized in accordance with an embodiment of the invention.

Referring now to the drawing, wherein like reference numerals refer to like elements throughout, FIG. 1 is a perspective view of a submount, 10, which can be utilized with the present invention. The submount includes a substrate, 11, which is typically silicon. Various electrical and optical components are mounted on a major surface of the substrate. (For purposes of illustration, areas of solder are shown as cross-hatched.) In this example, as also illustrated in the plan view of a portion of the submount illustrated in FIG. 3, a coplanar waveguide formed by metallizations 12–16, provide an input electrical signal. In particular, metallizations 12, 14, and 16 are grounded, while metallizations 13 and 15 conduct the input signals so that the metallizations form two input high speed transmission lines. In the context of this application, a high speed transmission line is considered to be any type of conductors which propagate an electrical signal with a frequency of at least 2.5 GHz. The signals in this example have high frequencies, typically in the range 10 to 40 GHz. Metallizations are typically gold. The signal conductors, 13 and 15 are coupled to respective contact pads, 17 and 18, which will be electrically coupled to electrodes of a modulator (FIG. 2) when the modulator is mounted to the submount.

Figure 8:
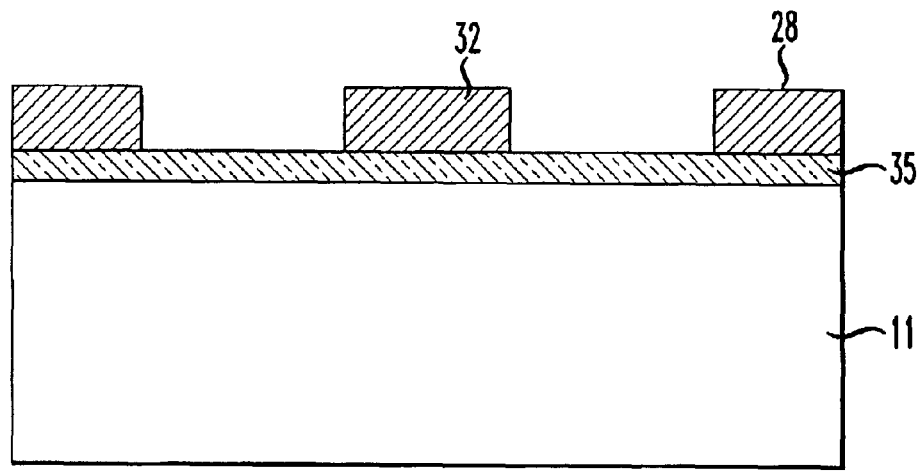
FIG. 8 is a cross sectional view of the further enlarged portion illustrated in FIG. 7.

Also coupled to the contact pads, 17 and 18, are conductors, 19 and 20, respectively, which are, in turn, electrically coupled to series-connected load resistors, 21, 22 and 23,24, respectively (also shown in the magnified cross sectional view of FIG. 8). As known in the art, load resistors are generally employed to match the impedance of the input transmission line, in this case 50 ohms, in order to prevent reflection of the electrical signal. A contact pad, 25, illustrated with segmented solder pads formed thereon, is also provided on the substrate for making electrical contact to the amplifier electrode of the modulator (FIG. 2) which will be mounted to the submount. Additional grounded bonding pads, 28 and 29, are further provided on the substrate for making electrical contact to respective high frequency capacitors (not shown). It should be understood that the capacitor pads need not be present for the purposes of the invention, but their presence provides a convenient ground connection as described further below.

Figure 2:
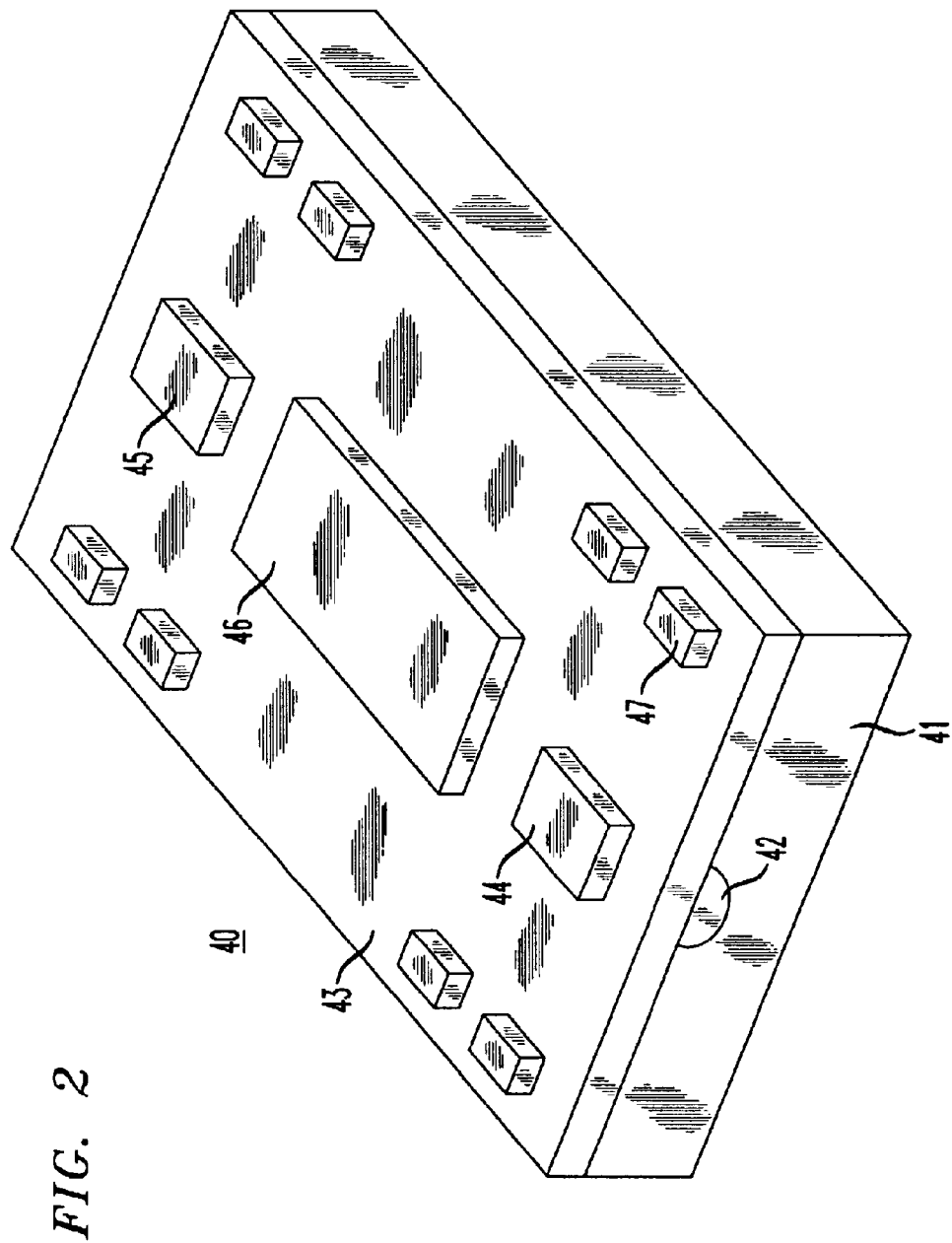
FIG. 2 is a perspective view of an optoelectronic device which can also be used in accordance with the same embodiment.
Figure 3:
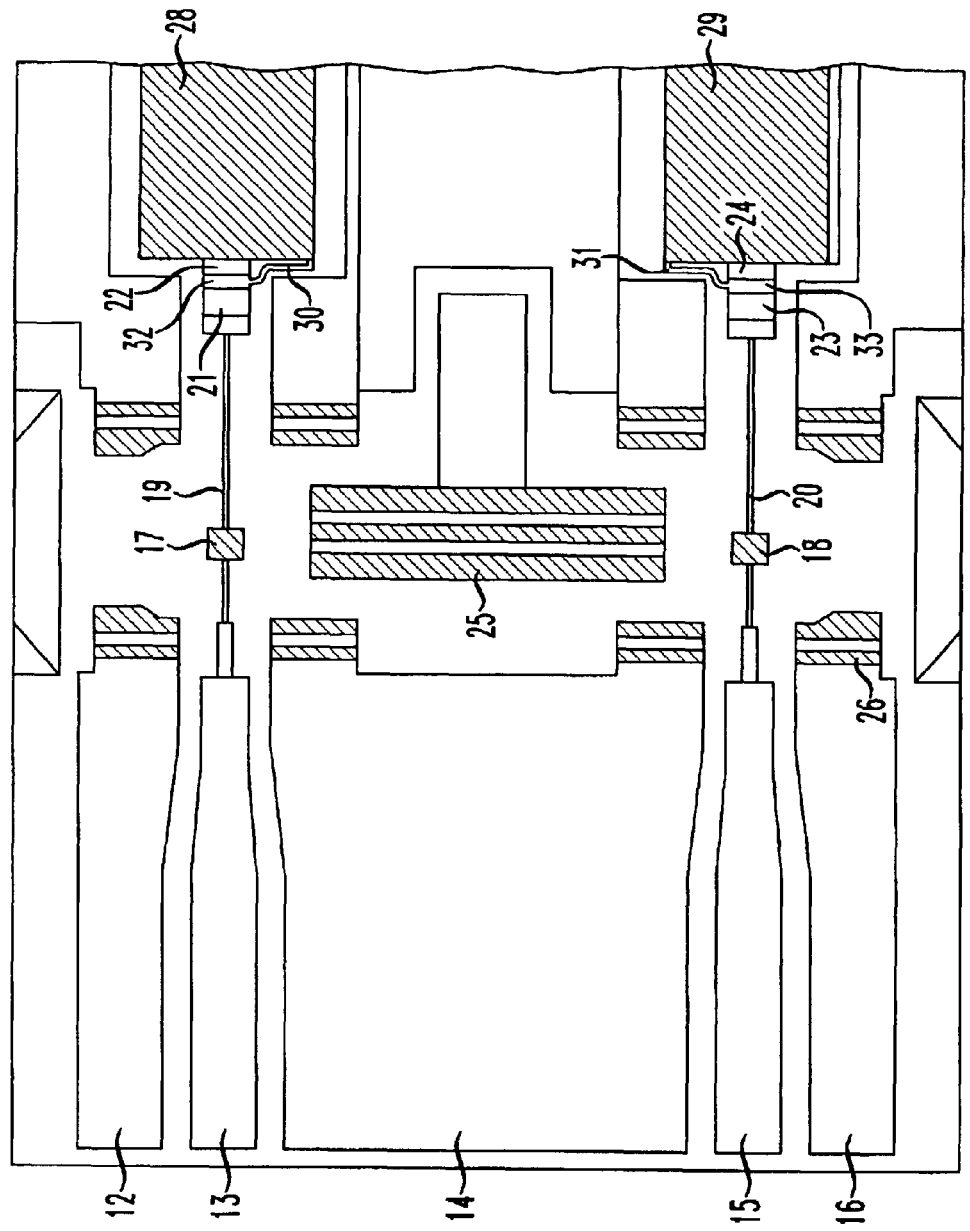
FIG. 3 is an enlarged portion of the submount of FIG. 1.

FIG. 2 illustrates a typical modulator, 40, which may be bonded to the submount, 10, illustrated in FIGS. 1 and 3. (Actually, FIG. 2 illustrates a device which includes two electrically isolated modulators integrated in the same device for providing carving and coding functions, but for the purposes of exposition is considered to be a single modulator.) In this example, the modulator includes a substrate, 41, comprising Indium Phosphide, with a standard optical waveguide, 42, formed in the substrate. An insulating layer, 43, is formed over the major surface of the substrate. Formed on the layer, 43, are electrodes, 44 and 45, for providing an electrical field to the waveguide which alters the loss experienced by light propagating through the waveguide, 42. Ground electrodes, eg, 47, were formed around the periphery of the device. An optical amplifier was also formed as part of the modulator. The electrode making contact to the amplifier is illustrated as 46. It will be appreciated that the modulator shown is merely one example of a device which may be bonded to the submount of FIG. 1.

The modulator is mounted to the submount by applying solder (not shown) to the pads on the submount and aligning the device so that the electrodes 44 and 45 make contact with the pads, 18 and 17, respectively, the amplifier electrode, 46, makes contact with the contact pad, 25, and the ground electrodes, e.g., 47, make contact with respective ground pads, eg, 26, on the substrate, 11. The modulator can provide some capacitive parasitics which could adversely affect the flatness of the line loss, and the skilled artisan can choose the termination resistance to compensate for this effect if it occurs.

Figure 5:
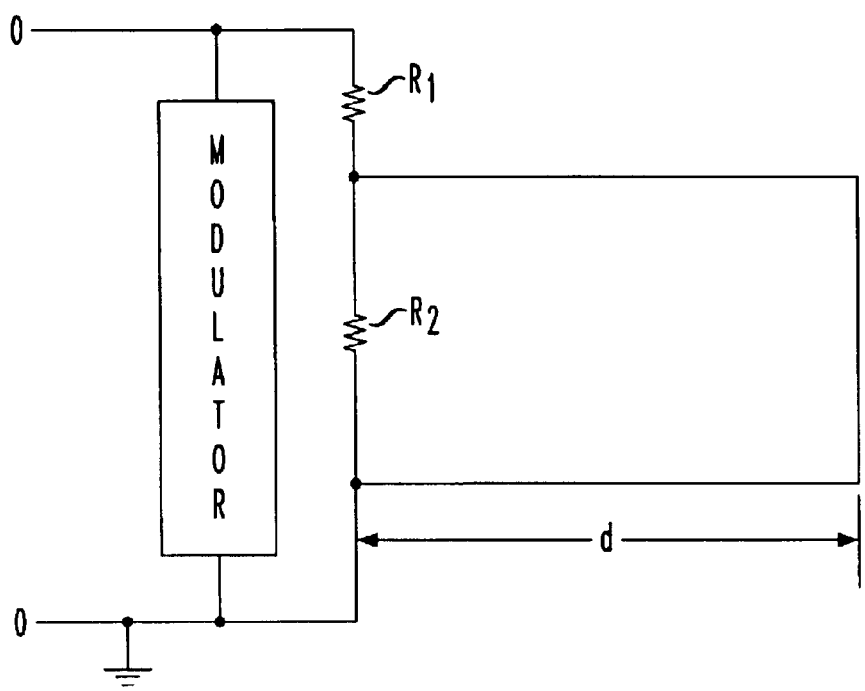
FIG. 5 illustrates an electrical circuit diagram for a portion of the submount of FIG. 1.
Figure 6:
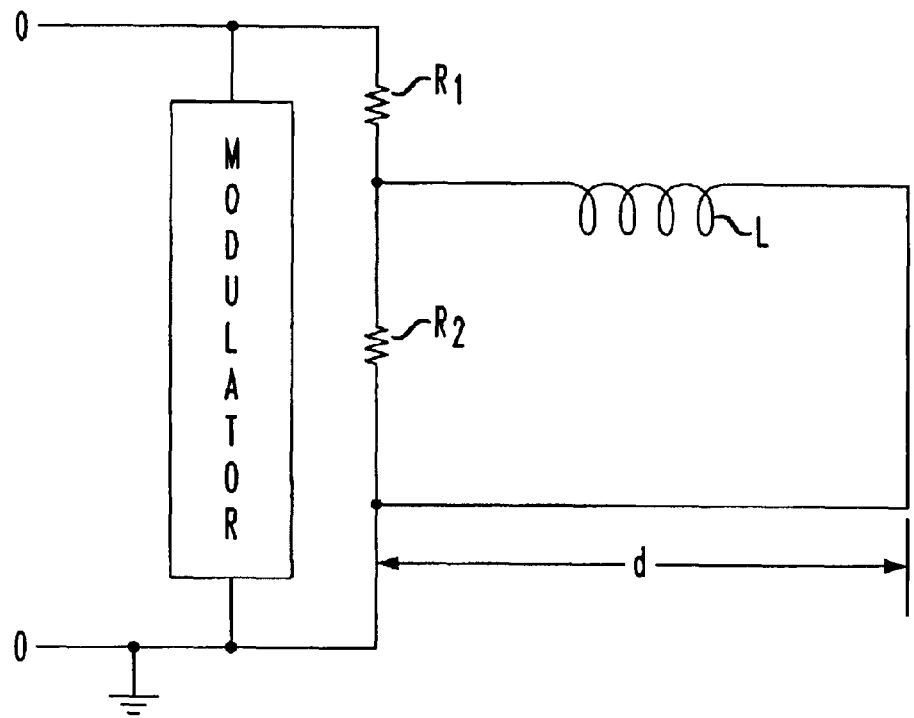
FIG. 6 is an electrical equivalent circuit for the circuit of FIG. 5.
Figure 7:
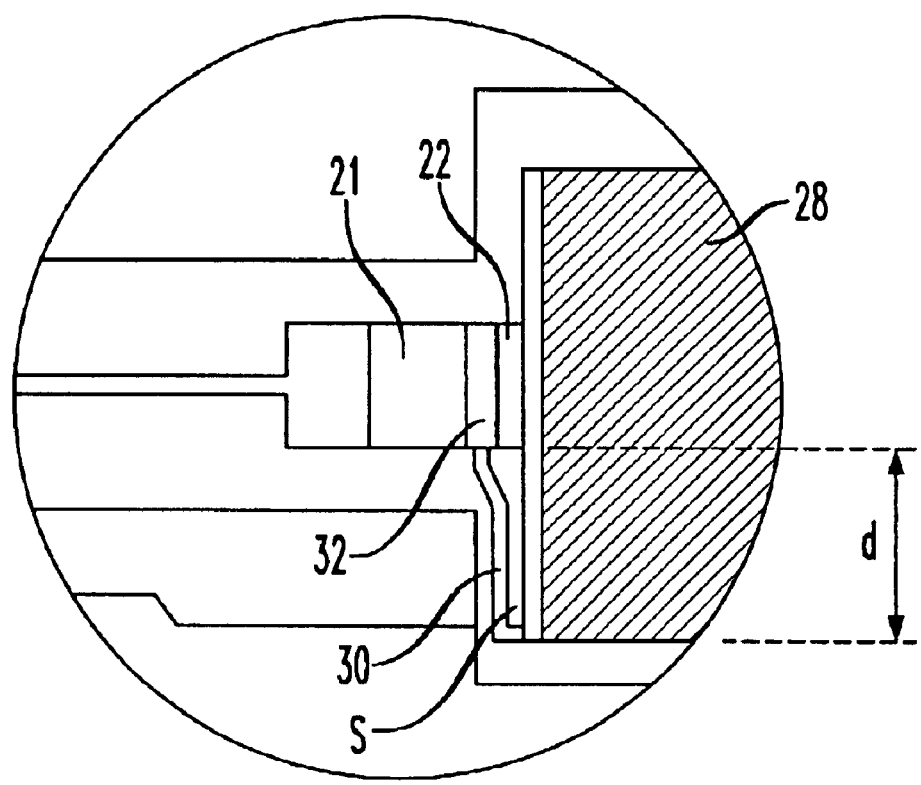
FIG. 7 is a further enlarged portion of the submount of FIG. 1.

FIG. 3 is an enlarged plan view of a portion of the submount of FIG. 1. It will be noted that conductors, 30 and 31, are provided on the substrate extending from electrodes, 32 and 33, between corresponding load resistors (21,22 and 23,24) to corresponding grounded capacitor contact pads, 28 and 29. That is, the conductors, 30 and 31, are shorted at their ends by connection to corresponding ground pads, 28 and 29. (See also the magnified view of FIG. 7.) These conductors, 30 and 31, are separated from corresponding ground pads, 28 and 29, for most of their length by a distance S (FIG. 7), and thus form high speed transmission lines carrying electrical signals from their corresponding load resistors (21, 22, and 23, 24). A circuit diagram of one of these portions of the submount is illustrated in FIG. 5, where the portion to the left of the modulator represents one of the input transmission lines formed by conductors 13 or 15, $R_1$ could be either resistor 21 or 23, $R_2$ could be resistor 22 or 24, and the portion coupled to the right of the resistors is the transmission line formed by either conductor 30 or 31. The length of the transmission lines (the total length of the conductor 30 or 31) is illustrated as "d". If d is short compared with the shortest wavelength (highest frequency) of the applied electrical signal from the input lines, 12–16, these transmission lines from the resistors can each be represented as an inductor, L, as illustrated in FIG. 6, where L can be the line formed by conductor 30 or 31. Preferably, d is less than $\lambda_m/2\pi$, where $\lambda_m$ is the shortest wavelength of the input electrical signal.

It will be noted from FIG. 8 that the load resistors, eg, 21 and 22, are actually made from a single layer, 35, of resistive material formed over the substrate, but because of the electrode formation, they behave electrically as two series connected resistors. One of the advantages of thin film resistors is that their resistance will be essentially constant regardless of the frequency of the input signals. It will be understood that the invention could also be employed where the resistors are physically separate.

Figure 4:
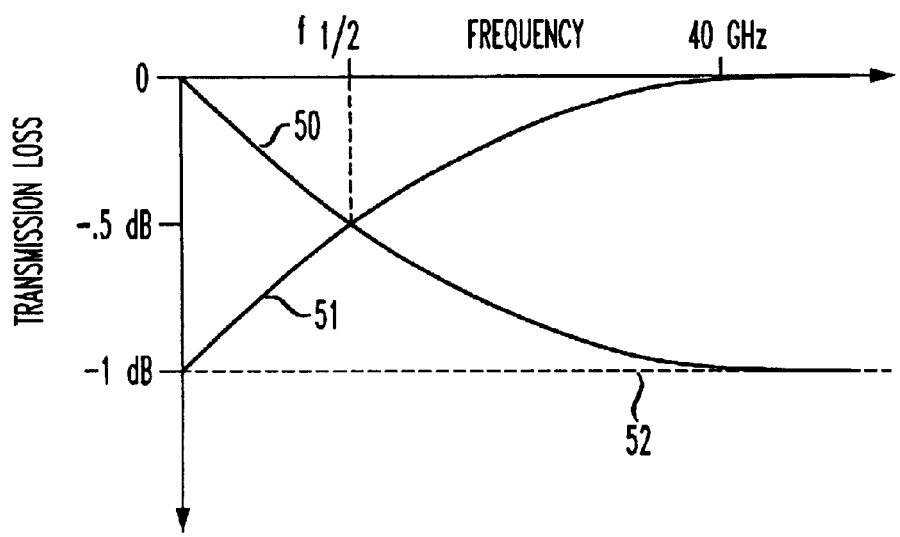
FIG. 4 illustrates transmission loss curves for the submount of FIG. 1.

FIG. 4 illustrates a typical transmission loss v. frequency curve, 50, for the input coplanar waveguide transmission line when properly terminated. It will be noted that the loss increases nonlinearly as a function of frequency from essentially zero at zero frequency to approximately 1 dB at 40 GHz. By choosing the parameters of the transmission lines formed from conductors, 30 and 31, a loss curve such as 51 can be produced which is essentially opposite to that of curve 50, ie, loss starts at about 1 dB at zero frequency and decreases to approximately zero at 40 GHz The lines formed from conductors 30 and 31, therefore, provide an equalization response so that the total loss for the submount is approximately 1 dB for all frequencies as illustrated in the flat curve 52.

Without being bound by any theory, it is believed that the circuit of FIGS. 5 and 6 provides an equalization response since the transmission lines formed from conductors, 30 and 31, acting like inductors, will provide a short to ground at low frequencies so the input sees only the first resistor, $R_1$, and the input impedance will not be well matched. At higher frequencies, the transmission lines will act as open circuits so that the input sees the higher resistance, $R_{1+}R_2$. Consequently, the loss will decrease as the frequency increases because the input impedance will be a closer match with the load resistors. By properly choosing the parameters as described below, the curve 51 can be made to match the curve 50 but in an opposite sense. For example, $R^1$ can be 40 ohms, and $R_2$ can be 10 ohms.

In one example, and not by way of limitation, a frequency, $f_{1/2}$ can be chosen on curve 50, which produces half the transmission loss (0.5 dB) produced by the input transmission lines. In this example, the transmission loss experienced by transmission lines formed from conductors 30 and 31 (curve 51) will intersect curve 50 at this point as shown. The impedance, Z, of each transmission line formed from conductors 30 and 31, and the inductances, L, of each line can be chosen to produce the curve 51. In particular, and not by way of limitation, the impedance, Z, could be determined empirically or by standard finite element analysis for the particular geometry and values of S. The dimension, d, can be chosen according to the equations:

$$L = \frac{R_2}{2\pi f_{1/2}} \quad (1)$$

$$L = Z\Delta T \quad (2)$$

$$\Delta T = \frac{v}{d} \quad (3)$$

where v is the propagation velocity of the signal down the transmission line, which in common types of transmission lines and materials is usually one-half the speed of light, or can be calculated by standard finite element analysis.

In one example, the value of S was approximately 15 microns, and the value of d was approximately 110 microns. The impedance, Z, was approximately 50 ohms and the inductance, L, was approximately 0.15 nH. In general, it is expected that the transmission lines will have a value S within the range 5–40 microns and a dimension d in the range 50–500 microns. In general, the impedance will be within the range 20 to 100 ohms, and the inductance within the range 0.05 to 0.5 nH. Of course, parameters outside this range can be employed.

It should be understood that FIG. 4 is an idealized drawing of transmission loss as a function of frequency which could be applied for any input impedance. The shapes of the curves would remain essentially the same, but the position of $f_{1/2}$ would change depending on the impedance.

Although the invention has been described with reference to exemplary embodiments, it is not limited to those embodiments. Rather, the appended claims should be construed to include other variants and embodiments of the invention which may be made by those skilled in the art without departing from the true spirit and scope of the present invention. For example, while the embodiment described aims for an essentially flat loss v. frequency characteristic, it may be desirable in some applications to produce a combined characteristic having another shape.

What is claimed:

1. An electronic device including a submount for mounting a component thereon, the submount comprising;
   first a contact for providing electrical contact to the component;
   a first high speed transmission line electrically coupled to the contact;
   at least two load resistors electrically coupled to the contact; and
   a second high speed transmission line comprising a conductor coupled between the two resistors to a ground electrode, wherein the impedance and inductance of the second line is such as to provide a loss v. frequency characteristic that is essentially opposite to that of the first line so as to produce a combined characteristic which is essentially flat.

2. The device according to claim 1 wherein the component is an optoelectronic component.

3. The device according to claim 2 wherein the component is a modulator.

4. The device according to claim 1 wherein the first high speed transmission line is a coplanar waveguide.

5. The device according to claim 1 wherein the second high speed transmission line has a length which is less than $\lambda_m/2\pi$, where $\lambda_m$ is the shortest wavelength of an input electrical signal applied to the first transmission line.

6. The device according to claim 1 wherein the inductance of the second line is within the range 20 to 100 ohms and the impedance of the second line is within the range 0.05 to 0.5 nH.

7. The device according to claim 1 wherein the combined characteristic has a loss of approximately 1 dB.

8. The device according to claim 1 wherein the first load resistor has an impedance of approximately 40 ohms, and the second load resistor portion has an impedance of approximately 10 ohms.

9. The device according to claim 1 wherein the combined characteristic is essentially flat up to a frequency of at least 49 GHz.

* * * * *